United States Patent
Olavarrieta et al.

(10) Patent No.: US 7,636,742 B1
(45) Date of Patent: Dec. 22, 2009

(54) AUTOMATED DATA RETRIEVAL

(75) Inventors: Jorge Olavarrieta, Richardson, TX (US); Janice C. Moorman, Austin, TX (US); Mark A. Johnson, McKinny, TX (US); Matt E. Hart, Lunenberg, MA (US)

(73) Assignee: Intuit Inc., Mountain View, CA (US)

( * ) Notice: Subject to any disclaimer, the term of this patent is extended or adjusted under 35 U.S.C. 154(b) by 465 days.

(21) Appl. No.: 10/982,661

(22) Filed: Nov. 4, 2004

Related U.S. Application Data

(60) Provisional application No. 60/559,169, filed on Apr. 1, 2004.

(51) Int. Cl.
*G06F 17/30* (2006.01)

(52) U.S. Cl. .......................... 707/204; 707/10; 715/255

(58) Field of Classification Search .................. 707/3; 705/31, 9

See application file for complete search history.

(56) References Cited

U.S. PATENT DOCUMENTS

| | | | |
|---|---|---|---|
| 4,890,228 A | 12/1989 | Longfield | |
| 5,138,549 A | 8/1992 | Bern | |
| 5,193,057 A | 3/1993 | Longfield | |
| 5,644,724 A | 7/1997 | Cretzler | |
| 5,724,523 A | 3/1998 | Longfield | |
| 5,774,872 A | 6/1998 | Golden et al. | |
| 5,875,433 A | 2/1999 | Francisco et al. | |
| 5,909,794 A | 6/1999 | Molbak et al. | |
| 5,963,921 A | 10/1999 | Longfield | |
| 6,032,137 A | 2/2000 | Ballard | |
| 6,202,052 B1* | 3/2001 | Miller | 705/31 |
| 6,473,741 B1 | 10/2002 | Baker | |
| 6,493,637 B1 | 12/2002 | Steeg | |
| 6,697,787 B1* | 2/2004 | Miller | 705/31 |
| 6,823,478 B1 | 11/2004 | Prologo et al. | |
| 7,257,553 B1 | 8/2007 | Baker | |
| 2001/0037268 A1 | 11/2001 | Miller | |
| 2002/0013747 A1 | 1/2002 | Valentine et al. | |
| 2002/0023055 A1* | 2/2002 | Antognini et al. | 705/40 |
| 2002/0111888 A1* | 8/2002 | Stanley et al. | 705/31 |
| 2002/0152165 A1 | 10/2002 | Dutta et al. | |
| 2003/0036912 A1 | 2/2003 | Sobotta et al. | |

(Continued)

OTHER PUBLICATIONS

"H&R Bock and NetZeroATM Offer Consumers Fast, Accurate Online Tax Preparation and Filing," United Online Press Release, Mar. 28, 2000, [online] [Retrieved on May 29, 2006] Retrieved from the Internet<URL:http://wwww.irconnect.com/untd/pages/news_releases.html?d=16829>.

(Continued)

*Primary Examiner*—Shahid A Alam
*Assistant Examiner*—Noosha Arjomandi
(74) *Attorney, Agent, or Firm*—Osha • Liang LLP

(57) ABSTRACT

Information missing from a database record is automatically identified and retrieved. In an embodiment, after the record is initially populated, a status such as complete, incomplete, missing, or verify is assigned to each field in the record. A request for information associated with the status is automatically generated, for instance asking a client to provide missing information or verify existing information. The request is transmitted to the client and solicits the client's response in any of a number of ways, for instance by email, phone, fax, or mail. The information is used to automatically update the record.

19 Claims, 14 Drawing Sheets

U.S. PATENT DOCUMENTS

| | | | |
|---|---|---|---|
| 2003/0074142 A1 | 4/2003 | Steeg | |
| 2003/0115198 A1* | 6/2003 | Singer et al. | 707/9 |
| 2003/0233296 A1* | 12/2003 | Wagner | 705/31 |
| 2004/0225581 A1* | 11/2004 | Wyle et al. | 705/31 |
| 2004/0267595 A1* | 12/2004 | Woodings et al. | 705/9 |
| 2006/0080284 A1* | 4/2006 | Masonis et al. | 707/3 |

OTHER PUBLICATIONS

"Microsoft and Block Financial Help Consumers Ease the Pain of Tax Season," Microsoft PressPass, Jan. 7, 1998, [online] [Retrieved on May 29, 2006] Retrieved from the Internet<URL:http://www.microsoft.com/presspass/press/1998/jan98/kiplngpr.mspx).

Backup Powers Online Data Protection Service for Quicken Turbo Tax Users, Business Wire, Jan. 17, 2000, p. 1211, 2 pages.

International Search Report for International Application No. PCT/US01/26182, dated Jan. 2, 2002, 6 pages.

Internet Access: Intuit to Provide Internet Access Directly From Quicken- Pt 1., Work-Group Computing Report, Oct. 23, 1995, vol. 6, No. 283, 3 pages.

Internet Access: Intuit to Provide Internet Access Directly From Quicken- Pt. 2, Work-Group Computing Report, Oct. 23, 1995, vol. 6, No. 283, 1 page.

Internet Access: Intuit to Provide Internet Access Directly From Quicken- Pt. 3, Work-Group Computing Report, Oct. 23, 1995, vol. 6, No. 283, 2 pages.

Kelley, D.; MacinTax Final Version Release Earlier Than Ever, Business Wire, Jan. 14, 1993, 3 pages.

Open Financial Exchange, Specification 2.0, Intuit Inc., Microsoft Corp., Apr. 28, 2000, 537 pages.

Quicken Turbo Tax: User's Guide TurboTax Deluxe- Tax Year 1999, 32 pages.

Turbo Tax: The Easiest Way To Do Your Taxes User's Guide for Windows 95 & Windows 3.1. Tax Year 1995, 58 pages.

* cited by examiner

FIG. 4

Collect Missing Data Utility - Jorge

1. Select the boxes next to the missing data you want to include in the e-mail/report.
   Click the link to jump to the input field.
   Click the name in the 'Name to use' column to change it.

Missing Data — 40

| Include | Form | Data Field Name | Name to use in Report/E-mail | Status |
|---|---|---|---|---|
| ☑ | Itemized Deductions | Home Mortgage Interest and Points on For... | Home Mortgage Interest and Points on For... | Not Sent |
| ☑ | Itemized Deductions | Home Mortgage Interest Not on Form 1098 | Home Mortgage Interest Not on Form 1098 | Not Sent |
| ☑ | Itemized Deductions | Points Not on Form 1098 [A] | Points Not on Form 1098 [A] | Not Sent |
| ☑ | Itemized Deductions | Investment Interest | Investment Interest | Not Sent |
| ☑ | Itemized Deductions | Investment Interest Carryover: Regular Tax | Investment Interest Carryover: Regular Tax | Not Sent |

Print Missing Data Report... — 50

2. Create an e-mail message to notify your client. (*required)

*Send To: jorge@abd.com

Subject: Information needed. Please reply.

Salutation: Dear Client,

Greeting: While preparing your taxes, I noted that we do not currently have the following information required for us to complete your tax return. Please provide this information at your earliest convience to ensure timely filing.

Missing Items:
   1. Itemized Deduction - Home Mortgage Interest and Points on Form 1098 [A]
   2. Itemized Deduction - Home Mortgage Interest Not on Form 1098
   3. Itemized Deduction - Points Not on Form 1098 [A]
   4. Itemized Deduction - Investment Interest

— 60

To send this e-mail message to your client using your e-mail program, click Create E-mail.

[ Create E-mail... ] [ Close ] [ Help ]

FIG. 5

| To... | jorge@abd.com |
|---|---|
| Cc... | |
| Bcc... | |
| Subject: | Information needed. Please reply. |

Dear Client,

While preparing your taxes, I noted that we do not currently have the following information required for us to complete your tax return. Please provide this information at your earliest convience to ensure timely filing.

Missing Items:
1. Itemized Deduction - Home Mortgage Interest and Points on Form 1098 [A]
2. Itemized Deduction - Home Mortgage Interest Not on Form 1098
3. Itemized Deduction - Points Not on Form 1098 [A]
4. Itemized Deduction - Investment Interest
5. Itemized Deductions - Investment Interest Carryover: Regular Tax

File Edit View Favorites Tools Help http://www.lacerte.com/viewmissingsdata.jsp?mID=ICXCJLFPNNQQA8dl=iq6ard Your tax preparer:
Peter Griffin
10 Spooner Street
Quahog, RI pgriffin12@aol.com (214) 555-1234 chat with Peter Griffin

Dear Taxpayer-

I need the following information to complete your tax return

1. Investment Interest

2. Home Mortgage Interest

3. Investment Loss Carryover

Save  Complete  Send

Where can I find this data?

more information about field add comment

○ Internet

FIG. 7

| FIG. 7A | FIG. 7B |

FIG. 7A

| 2003 Larerte Individual Tax | | |
|---|---|---|
| Client E-File Print Filter View Tools Settings Help | | |

Clients | Details | Forms | Diagnostics | Analysis

All Clients

| Views | Full Name (LNF) | Client No. |
|---|---|---|
| | A Bulk, Sale | 01SAMPLE |
| All Clients | A Contribution, Withdraw Exc... | 02SAMPLE |
| | A Couple, Basic and Average | 03SAMPLE |
| | A Farmer, Joe and Sue | 04SAMPLE |
| e-file Clients | A Filer, Electronic | 05SAMPLE |
| | A Full IRA, Mr. and Ms. | 06SAMPLE |
| e-org Clients | A Home, Office | 07SAMPLE |
| | A Keogh, Deduction | 08SAMPLE |
| Filter | A Limited IRA, Mr. and Ms. | 09SAMPLE |
| | A Multi-State, Full Year and N... | 10SAMPLE |
| ⊞─ Client Status | A Multi-State, Part Year and ... | 11SAMPLE |
| ─ Preparers | A Nondeductible, Mr. and Ms. | 12SAMPLE |
| ⊞─ Firms | A Partnership, Taxpayer and ... | 13SAMPLE |
| | A Passive Example, Mr. and ... | 14SAMPLE |
| ⊞─ Fed e-file Status | A Sample, Child | 15SAMPLE |
| ⊞─ State e-file Status | A Sample, Dad and Mom | 16SAMPLE |
| | A Sole, Proprietor | 17SAMPLE |
| ⊞─ Fed e-file 1st Ext Status | A Wage, Earner | 18SAMPLE |
| ⊞─ Fed e-file 2nd Ext Status | An Investor, Mr. and Ms. | 19SAMPLE |
| | An Oil, Gas Example | 20SAMPLE |

Search: | Pre-Filters: none

FIG. 7B

| Missing Data? | Status | Needs REP | St. Ret. |
|---|---|---|---|
| ✓ | Under Re... | | |
| | Proforma'd | | US |
| | Under Re... | | US |
| | Info Pend... | | US |
| | On Exten... | | US |
| | Proforma'd | | US |
| ✓ | Under Re... | | US |
| | Proforma'd | | US |
| | Under Re... | | US |
| ✓ | Proforma'd | | -- |
| | On Exten... | | -- |
| | Final | | US |
| | Info Pend... | | US |
| | Under Re... | | US |
| | Under Re... | | US |
| | Final | | US |
| | Under Re... | | US |
| | Proforma'd | | US |
| | Under Re... | | US |
| | Proforma'd | | US |

Selected: 0 of 50

FIG. 8

| Full Name (LHF) | Missing Data? | Adj. Gross Inc. | TP Home Phone |
|---|---|---|---|
| A Bulk, Sale | Yes | 669389 | 214 555-2589 |
| A Contribution, Withdraw Exc... | Yes | 52000 | 214 555-9666 |
| A Couple, Basic and Average | Yes | 81113 | 214 555-4444 |
| A Farmer, Joe and Sue | Yes | 206553 | |
| A Filer, Electronic | Yes | 30000 | 972-490-8500 |
| A Full IRA, Mr. and Ms. | Yes | 36000 | 214 555 4567 |
| A Home, Office | Yes | 256117 | 214 555-7214 |
| A Keogh, Deduction | Yes | 101273 | 214 555-6934 |
| A Limited IRA, Mr. and Ms. | Yes | 48000 | 214 555-8654 |
| A Multi-State, Full Year and Nonresident | Yes | 131896 | 214 555-4444 |
| A Multi-State, Part Year and Resident | Yes | 131896 | 214 555-4444 |
| A Nondeductible, Mr. and Ms. | Yes | 55500 | 214 555-5555 |
| A Partnership, Taxpayer and Partner | Yes | 0 | |
| A Passive Example, Mr. and Ms. | Yes | -23100 | 214 555-1478 |
| A Sample, Child | Yes | 3000 | |
| A Sample, Dad and Mom | Yes | 81646 | 214 555-4444 |
| A Sole, Proprietor | Yes | 2401 | 214 555-8555 |
| A Wage, Earner | Yes | 35252 | 214 555-1111 |

Custom Preview — 3/24/04 — 7:29pm
Custom Reports: Missing data report
Lacerts Software Testing

FIG. 9

Custom Preview

3/24/04
7:29pm

Custom Reports: Missing data report

Lacerts Software Testing

| Customer Name | Fields Missing | Days since message, if any, sent | % Complete | Status |
|---|---|---|---|---|
| Customer 1 | California nontaxable interest income; State income tax refund; Social Security benefits; Unemployment compensation | 36 days since request email; 5 days since reminder. | 30% | Awaiting reply. |
| Customer 2 | None. | | 100% | Completed return sent to client 3/1. |
| Customer 3 | California income tax withheld; California real estate or nonresident withholding | 20 days since request email. | 72% | Data sent 3/15. Not yet confirmed. |
| Customer 4 | Excess California SDI (or VPDI) withheld; Estimated tax payments and other payments | 15 days since request email. | 80% | Website visited 3/10; site report not yet complete |

Previous | Next | |<  >|

Print | Close

FIG. 10

| Forms | Diagnostics | Analysis |

Critical Diagnostic Warnings

- ☐ Street address missing.
- ☐ City of residence must be at least three characters.
- ☐ State is missing or invalid. The state abbreviation is not a standard postal abbreviation.
- ☐ Zip code is missing.
- ☐ Interest Income Item #1: Name of payer not entered.
- ☐ Dividend #1: Name of payer not entered.

Informational Diagnostics

- ☐ An entry in 2002 tax liability may reduce Form 2210 penalty.
- ☐ <u>Jump to a list of all input fields currently marked as missing data. To clear all of the missing data tags in this return, click the Tools menu, click Clear all missing data tags for client.</u>

FIG. 12

03/30/2004  Client Missing Data Report  Page 1

Client Name: Alex Riddle  Client Number: 848-022

| Num | Missing Item | Current Data | Notes | Override Data | Status | Status Date |
|---|---|---|---|---|---|---|
| 1. | California nontaxable interest income | - | | | Missing | 3/10/04 |
| 2. | State income tax refund | $2,200 | | | Need to Verify | 3/10/04 |
| 3. | Social Security benefits | $500 | 1st job only | | Incomplete/Missing | 3/10/04 |
| 4. | Unemployment compensation | $0 | | | Complete | 3/10/04 |

AUTOMATED DATA RETRIEVAL

CROSS REFERENCE TO RELATED APPLICATIONS

This application claims the benefit of U.S. provisional application No. 60/559,169, entitled "Missing Data Collection" and filed Apr. 1, 2004, which is hereby incorporated by reference in its entirety.

FIELD OF THE INVENTION

The present disclosure relates in general to database software and in particular to software to facilitate data retrieval.

BACKGROUND OF THE INVENTION

Tax return preparation is a document intensive process that requires the gathering of information memorialized on disparate paper documents collected from various sources. Once the relevant data has been located, calculations in consultation with tax tables and related official documents are performed to determine a taxpayer's outstanding surplus or debt to the tax authority. In the field of professional tax preparation, it is rarely the case that an individual taxpayer will initially provide a complete client record containing all the necessary information to her tax preparer. More typically, a tax accountant must determine what information is missing from a client record and follow up with requests to the client, typically made over the phone. Tax preparers often have to make several requests for documents, expending considerable energy trying to obtain the required data. Effort spent in the back and forth between tax preparer and client soliciting and providing information can contribute considerably to the overall headache associated with tax preparation.

The problems associated with incomplete or missing data extend generally tax preparation but to settings where data is exchanged between parties. In financial services, for instance, an applicant for a loan or new account may not have information required by the application form at her immediate disposal, requiring a number of iterations to complete the process. Other information sharing environments including accounting, human resources, legal compliance, and procurement are plagued with similar issues. While some online forms allow users to save records they are working on in order to allow them to provide information in stages, there are no systems for proactively gathering the missing information.

What is needed is a way to automate the identification and retrieval of missing or other needed data.

SUMMARY OF THE INVENTION

In accordance with the present invention, systems and methods for data retrieval are disclosed. In an embodiment, after a form, application, or record is initially filled out by a client, fields in the record are assigned by the forms preparer's system a status such as missing or complete. A request for missing information is automatically generated at the forms preparer's system that identifies the missing information, saving the client or forms preparer the trouble of having to remember what information is still outstanding. The request is electronically transmitted to the client's computer system. The client receives the request and sends back a response containing the requested information. The forms preparer's system receives the response and can automatically integrate the information contained in the response into the client's record, resulting in a more complete record. The forms preparer can monitor the workflow associated with the data retrieval process—from identifying the missing information to updating the record—using the application in which the form is being prepared. The overall process reduces the administrative burden on both the forms preparer and the client.

In an embodiment, a data retrieval system comprises a database, status module, and data retrieval module. The database includes a plurality of records corresponding to instances of a form, each record associated with a client and containing a plurality of fields and contact information for electronically communicating with the client. The status module is communicatively coupled to the database and is configured to assign a status to each of a plurality of fields of a record including a status associated with obtaining data from the client associated with the record. Responsive to a status of a field in a record associated with obtaining data from the client, the data retrieval module is configured to generate a request to the client using contact information for the client, transmit the request to client, and receive a response from the client to the request.

In another embodiment, information is solicited for a client record by assigning a status to each field of a plurality of fields in the record and automatically generating an information request based on the status of the fields in the record and transmitting the information request to the client. After receiving a response from the client responsive to the request, a field in the record corresponding to the response is updated. In another embodiment, the invention comprises various computer program products for carrying out these and other steps provided.

BRIEF DESCRIPTION OF THE DRAWINGS

FIGS. 3-12 depict various graphical user interfaces for implementing and managing aspects of data retrieval performed in accordance with embodiments of the invention.

The figures depict embodiments of the present invention for purposes of illustration only. One skilled in the art will readily recognize from the following description that alternative embodiments of the structures and methods illustrated herein may be employed without departing from the principles of the invention described.

DETAILED DESCRIPTION OF THE PREFERRED EMBODIMENTS

While the present invention will be described in connection with preferred embodiments thereof, it will be understood that it is not intended to limit the invention to those embodiments. On the contrary, it may not cover all alternatives, modifications, and equivalents as may be included within the spirit and scope of the invention as defined by the appended claims.

Embodiments of the invention can be used to automate aspects of professional tax preparation. Take for example a tax preparation application such as Lacerte Tax, offered by Intuit, Inc. of Mountain View, Calif. The application is coupled to a repository or database that stores records for use with the application. The records are organized by taxpayer, so that each taxpayer's record contains the relevant tax information for the taxpayer. The application allows for the manipulation and viewing of data at various levels, including at level of a field within a record, at the record level, and the global level, meaning one or more records stored within the database. The application includes or is coupled to a data retrieval module capable of generating messages based on data stored in the repository. The data retrieval module can create request messages to be sent through a variety of forms of communications depending on the client's needs. The client can then respond to the message by providing any requested information or response, either through a network or following a conventional communications protocol. The data retrieval module forwards the requested information to the application where it is saved to the database. The complete tax return is automatically prepared using the provided information and transmitted to the tax authority.

Data Retrieval System

Figure 1:
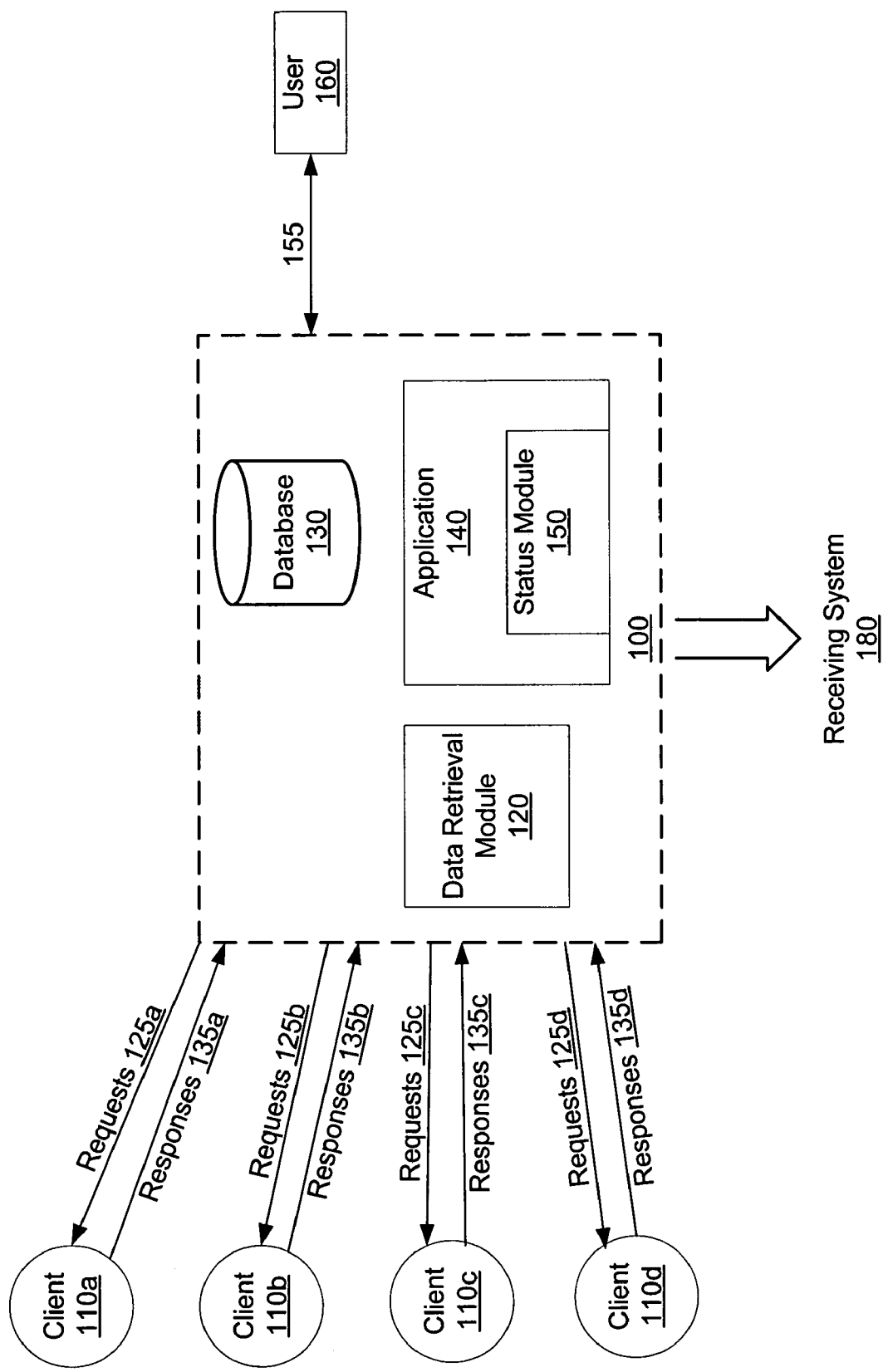
FIG. 1 is a high-level block diagram of a data retrieval system in accordance with an embodiment of the invention.

FIG. 1 depicts a data retrieval system 100 in accordance with an embodiment of the invention. The system includes a data retrieval module 120, database 130, and application 140 including a status module 150. A user 160 accesses the application 140 over a network connection 155 and uses it to create records in the database 130 associated with one or more clients 110. Each record corresponds to a form (for instance a tax form) or application (such as an application for a home loan), and contains various fields that are associated with instances of the form or application. A database record is initially populated with information provided from the user 160, client 110, other records in the database 130 or another source. After the record is initially populated, the status module of the application 140 assigns status values to the fields in the record. This information is stored in the database 140 and is used by the data retrieval module 120 to determine what follow up actions need to be taken.

The data retrieval module 120 creates a request 125 based on the status of the fields in the database record, for instance asking for additional information to populate fields marked as incomplete or missing. The module transmits requests 125 to clients 110 who in turn provide responses 135 containing the requested information to the data retrieval module 120 for storage in the database 130. If the client 110 does not respond within a predetermined period of time or a response 135 is incomplete or prompts further inquiry, a reminder or follow-up request 125 may be provided to the client 110. Additional calculations or assessments by the user 160 or application 140 may be performed based on information stored in the updated record. Once complete, the application or form can be output to a receiving system 180 for further processing.

Application

The system includes an application 140 for creating a database record. In an embodiment the application 140 supports preparation of a form, application, bid or other submission to be submitted to a receiving system 180 such as a tax authority, school, regulatory authority, compliance agency, competitive bid administrator, or other entity for evaluation. Each record represents an instance of a form or submission associated with a specific client 110. The application may include a graphical user interface for soliciting the information required for the submission that can be used by the user 160 or a client 110 to enter the information provided. The application 140 may be hosted on a desktop computer, be web-based, or be administered over a corporate network by a secure network server. The application 140 can be accessed by the user through a user computer (not shown). Access to information stored in the database 130 is controlled through a log-on or other conventional or emerging authentication system.

Database/Record

Records created in the application 140 are stored in a database 130. The database 130 could comprise one or more flat, relational, or other types of databases and/or include a relational database management system (RDBMS) such as offered by Oracle, Sybase, Informix, or Microsoft SQL, or a lightweight database access protocol (LDAP) database. The records may be initially populated by various sources. In one embodiment, the client 110 uses an interface of the application 140 to enter the information, for instance, and no involvement from the user 160 is required. In another embodiment, the client 110 provides initial information to the user 160, which uses the application 140 to create a record to store the client's information. The user provides the information over a network connection 155. As used herein throughout the disclosure, the term "network connection" refers to any connection or combination of connections supported by a digital, analog, satellite, wireless, firewire (IEEE 1394), 802.11, RF, local and/or wide area network, Ethernet, instant message, TCP/IP, HTTP, email, web server, or other communications device, router, or protocol.

In another embodiment, one or more records is initially populated based on existing information about a client 110. For instance, if a client's tax return from the previous year is stored in the database 130, in an embodiment, a record comprising a new tax return is created based on information contained in the previous year's tax return such as the client's contact information, number of dependants. A statistical model such as one of the models described in U.S. Provisional Patent Application filed Sep. 7, 2004, Ser. No. 60/608,035 entitled "My Tax History," to Quinn, which is hereby incorporated by reference in its entirety, may be used to determine what information is likely to remain unchanged from year to year and can be used to populate the new record.

Status Module

A status module 150 can be used to indicate the status of fields in one or more records stored in the database 130. The status module may be integrated into the application 140, or may be a separate utility that works with the application 140. In an embodiment, the status module 150 automatically assigns a status to each field in a record, in another the user 160 uses the status module 150 to mark data fields or verify the selections made by the status module 150. To automatically assign status values to fields in a record, the status module 150 compares the value stored in each field to an expected value. Referring to a tax return context, for instance, certain fields in a tax form must be populated for every user including identifying data, income data, and the number of dependants. Other fields only need to be populated under certain circumstance, for instance if the client 110 has capital gains to report. The format of the data provided in each field is also circumscribed—for instance, a social security number field should include a 9-digit integer. A set of rules reflecting these expected values or ranges may be supplied to the module 150 by the user 160 or another source. The status module 150 in turn can automatically assign status values to fields in the record based on the rules—for instance assigning a value of "missing" to any field where a value is expected and not provided, a status of "incorrect" to any field where a provided value does not conform to an expected value, a status of "incomplete" where data entered is only partial, or by any other status that could be predefined by the application 140 or which a user 160 could define and specify. The process of creating a user-defined tag could be facilitated using a "create tag" wizard or other user interface. The assigned status value may be stored in "status" fields associated with fields of the record.

Figures 3A, 3B:
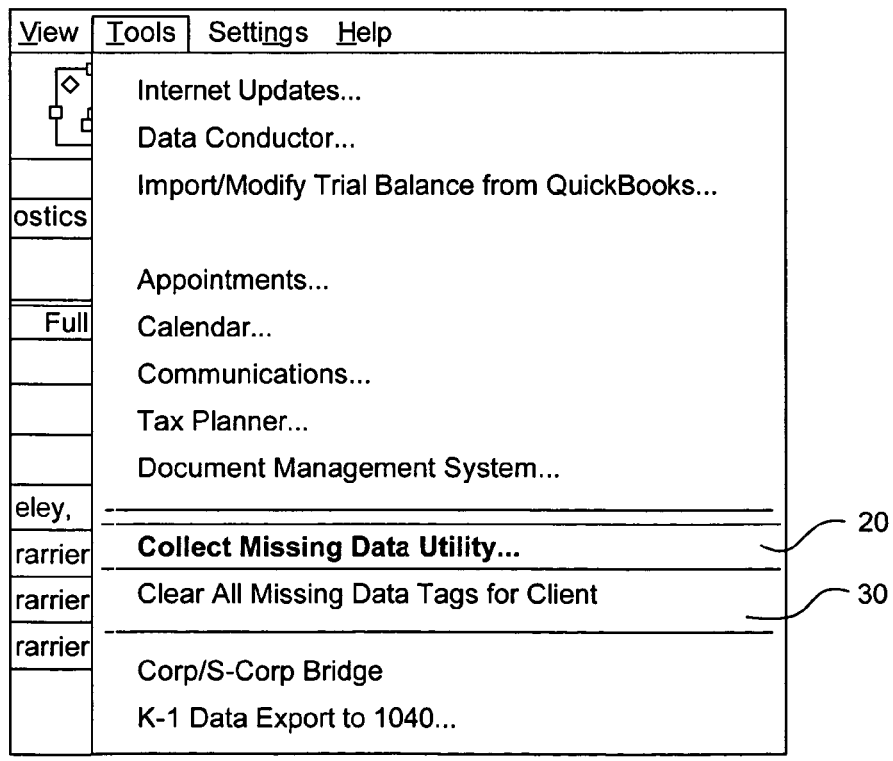

In another embodiment, a user 160 can provide and manage status information using a status module 150. FIG. 3A shows an exemplary user interface that enables a user 160 to indicate that information in a given field, "Home mortgage interest & points on Form 1098" is "Missing." As one of skill in the art would know, a variety of fields could be marked as "Missing" or with another status. In the tax preparation arts, for example, a common missing data field is related to stock transactions. If the prior year contains a stock purchase, but no record of the stock exists in the current year, then the accountant must contact the client and obtain that information. The user interface of FIG. 3A includes a context menu including a missing data item 10 that can be selected to change the status of the field to missing. Other formats for data entry such as a dialog box may also be used. Once the field is tagged as missing, a visual indicator, such as the jagged border shown, is included on the field. Although FIG. 3A depicts a status "tag" attached to an individual field, similar identifiers may be attached to records, or groups of records, stored within the repository. In an embodiment, a database stored in the repository contains a reference to the field along with "missing data" information. This information includes a custom description for the field, date/time information, communications data, archiving/history data, and a status for the field. If the user 160 marks a field as missing data, a record is added in the database 130. If the user 160 removes the missing data tag, the change is recorded in the database 130. The status module 150 may include a setting that allows the user to choose the automated setting of status data, based on parameters provided by the user 160, and the user 160 can verify those selections using the user interface. Providing a user 160 with the ability to tag fields as missing in the course of normal data entry minimizes interruption.

Once the status of a record or field is provided, the user 160 can take an action based on the status. FIG. 3B displays a user interface that allows a user 160 to take various actions based on the presence of "Missing Data." In an embodiment, such menu options are only available once a field has been tagged, automatically or manually, as missing. As shown, menu options available to a user include "Collect Missing Data Utility" 20, selection of which launches a message generation program, or "Clear All Missing Data Tags for Client" 30, which changes the status of fields previously marked as "Missing Data." One of skill in the art would know that other options, including based on other tags, may also be presented. Toolbar icons, buttons, links, or other graphical interfaces, may also be used.

Data Retrieval Module

The data retrieval module 120 obtains or receives status information stored in the database 130 and uses it to obtain the required data or confirmations from one or more clients 110. In an embodiment, the data retrieval module 120 comprises a centrally hosted system that receives a notification of status information from the application 140 over a network connection. The notification specifies relevant fields and/or records, the status of the fields in the records, and how the information should be retrieved. The notification may provide that several different sources need to be queried for information, for instance, different clients 110 or their agents if work is being done collaboratively for instance, or the information resides in different places. The data retrieval module 120 issues requests to all the different sources of data, minimizing the hassle for the user 160.

In another embodiment, the data retrieval module 120 queries the database 130 on a regular basis or in response to a notification from the application 140 and retrieves information about records in the database 130 that require follow up action. The data retrieval module 120 has the necessary authorizations or permissions to access the database 130 and in an embodiment provides those with its request. The data retrieval module 120 uses the status information to generate a request 125 to be sent to a client 110 based on instructions from the user 160 stored in the database 130, status module 150, or other location. In an embodiment, the data retrieval module 120 solicits information electronically, through an email, chat, or other request. The request may be automatically formulated and sent by the data retrieval module 120 or may be created and provided to the user 160 through an interface for verification before sending. The request may include a link to a secure website or a data object that can be populated, saved, and returned to the data retrieval module 120. Or the request may solicit a response 135 from a client 110 in the form of a return email. Described in greater detail below, FIGS. 4 and 5 provide exemplary interfaces a user 160 can use to create such an email request, and FIG. 6 represents a website through which a client 110 can supply the requested information.

In an embodiment, the data retrieval module 120 can also transmit the request by email, phone, fax, mail, or other conventional means. The data retrieval module 120 includes computer software for formulating a request coupled to an output interface for transmitting the request. In the case of a request transmitted to the client's telephone, a standard autodialer system including voice generation, dialing, and/or messaging capabilities may be used to formulate a message. The phone message may be created using a prerecorded message template, synthesized using voice generation software based on a predetermined text script, or be based on a live recording provided by the user 160, a call center representative, or other party. Or, the phone message can be generated by application of voice synthesis to an email message that is sent to the client 110. The autodialer system may in turn transmit the message over a telephone line (for instance a plain old telephone services (POTS), voice over IP, wireless, or other line), leaving a message if the client 110 is not home. The message may solicit a touch-tone response which is detected and recorded by the data retrieval module 120, or a verbal response that is recorded, or may comprise a reminder for the client 110 to provide the data in another form to the user 160. A verbal rather than text solicitation may be more suitable in certain cases such as where a yes or no response is needed, or there are limited options for selection by the client 110. In an embodiment, the data retrieval module 120 differentiates between different types of data requests based on the response solicited or the nature of the information (i.e. whether or not the client 110 is likely to have the information at her immediate disposal), and chooses the method of communication with the client 110 based on this response.

In the system shown in FIG. 1, the data retrieval module 120, database 130, and application 140 comprise separate and distinct elements. However, it is not necessary for these and other elements to be housed as shown; the elements can be hosted by other entities or in sub-modules of the elements may stand-alone or together. In addition, embodiments of the invention may not require any intervention from a user 160, and be administered purely between the data retrieval system 100 and clients 110. Likewise, as these and other elements are described throughout the invention, it should be understood that various embodiments of the invention may exclude elements and sub-elements described, or include other components entirely.

Computer System

Figure 2:
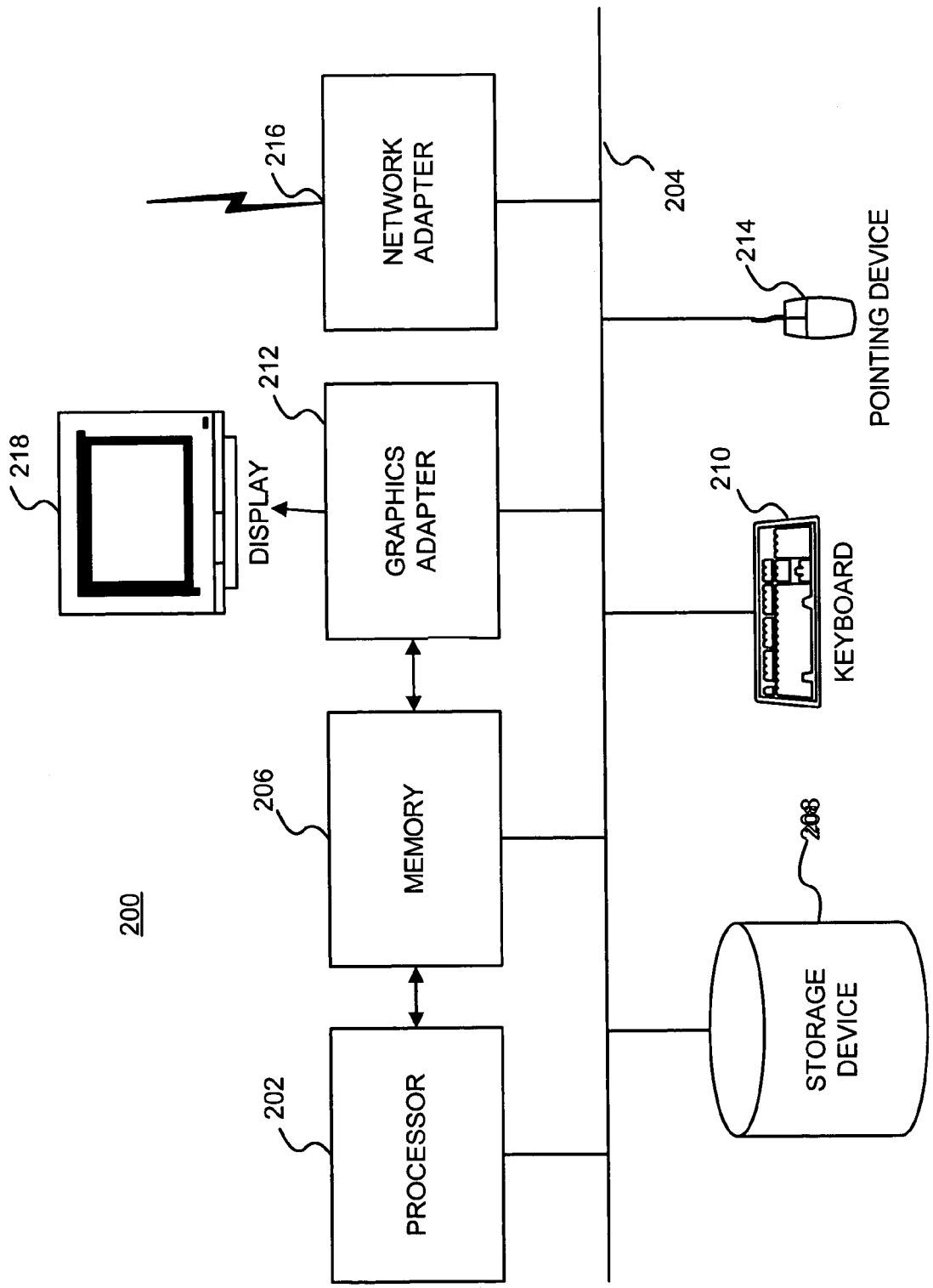
FIG. 2 is a high-level block diagram of a computer system for hosting one or more components of the system of FIG. 1 in accordance with an embodiment of the invention.

FIG. 2 is a high-level block diagram of a computer system 200 for hosting one or more components of the system of FIG. 1 in accordance with an embodiment of the invention. Other elements and sub-elements described below may also be hosted on such a computer 200. Illustrated are at least one processor 202 coupled to a bus 204. Also coupled to the bus 204 are a memory 206, a storage device 208, a keyboard 210, a graphics adapter 212, a pointing device 214, and a network adapter 216. A display 218 is coupled to the graphics adapter 212. The computer system 200 may take the form of a server, laptop, workstation, handheld device, or other general-purpose or specialized computing device.

The processor 202 may be any general-purpose processor such as an INTEL x86, SUN MICROSYSTEMS SPARC, HP NonStop, or POWERPC compatible-CPU. The storage device 208 is, in one embodiment, a hard disk drive but can also be any other device capable of storing data, such as a writeable compact disk (CD) or DVD, or a solid-state memory device. The memory 206 may be, for example, firmware, read-only memory (ROM), non-volatile random access memory (NVRAM), and/or RAM, and holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to the network.

As is known in the art, the computer system 200 is adapted to execute computer program modules for providing functionality described herein. As used herein, the term "module" can refer to computer program logic for providing the specified functionality. A module can be implemented in hardware, firmware, and/or software. Preferably, a module is stored on the storage device 208, loaded into the memory 206, and executed by the processor 202.

The types of hardware and software within the computer system 200 may vary depending upon the implementation of the data retrieval system 100. For example, a data retrieval system 100 operating in a high-volume environment may have multiple processors and hard drive subsystems in order to provide a high processing throughput, as well as be coupled to multiple clients 110 and users 160. Likewise, certain embodiments may omit certain components, such as the display 218, keyboard 210, and/or network adapter 216 depending upon the specific capabilities of the system. In addition, the computer system 200 may support additional conventional functionality not described in detail herein, such as displaying images in a variety of formats, allowing users to securely log into the system, and supporting administrative capabilities.

Interfaces for Message Creation

As described above, in embodiments of the invention, requests for missing data are transparently generated and sent automatically without the need for user 160 input. However, the user 160 may also use an interface to verify or provide input to message creation. An interface for use with a "Collect Missing Data Utility," one example of the data retrieval module 120 of FIG. 1, is shown in FIG. 4. As shown, the data retrieval module 120 can generate an email message requesting information tagged in the repository 130 as missing and send the message to a client 110 through a user's e-mail program. However, the data retrieval module 120 can also output status information to a printable or an electronic document such as a PDF that can be provided to the client or used internally. To generate the list 40 of missing data shown in the upper window of the interface in FIG. 4, the data retrieval module 120 queries the database for missing data for the particular taxpayer whose record is being worked on. By selecting the "Print Missing Data Report" option 50 shown on the toolbar, a user 160 can generate a record report such as that shown in FIG. 10 or 12.

A pre-populated message template 60 is provided in the lower portion of the interface of FIG. 4. The data retrieval module 120 accesses the relevant client record in the repository 130 and collects addressing information, and also includes a Subject, Salutation, and Greeting selected based on default information provided by the data retrieval module 120 or instructions provided by the user 160. Any of this information can be changed by the user 160, and as described above, may be saved for use in the creation of future messages. The user 160 will also be able to choose the address to which the reply from the client taxpayer 110 will be returned. The program will default to the email address for the appropriate client 110 (as determined by the email addresses entered in) or allow the user 160 to select a different address to which the reply from the taxpayer 110 will be returned.

This information, as well as the user's 160 choices of what data fields to include, is used to generate an e-mail message such as the message depicted in FIG. 5 using Messaging Application Programming Interface (MAPI) or existing or emerging protocol offering the same functionality. An e-mail is then created in the user's 160 local e-mail program, for instance Microsoft Outlook, Yahoo!Mail, or other MAPI-enabled program. In an embodiment, where the user's 160 email program cannot be directly accessed, the utility does not actually create an email but instead creates a text message that can be pasted into a blank email by the user 160. In an embodiment the message is output to an electronic notepad, note, or similar simple format; in another the message text is copied to a user's electronic clipboard, so it can it does not have to be copied before it is pasted into a message by the user 160. The user 160 then pastes the relevant text into a message form of the user's email program and sends to the client 110 over a network.

The table of missing data items 40 shown in the top portion of FIG. 4 allows the user 160 to specify whether the missing data should be included in the email message. The user 160 is given the ability to choose missing data fields to include in this message through checkboxes that are checked in their default form. The table also details which IRS or state tax form the missing data is associated with and provides the data field name, including a link back to the actual data entry field. The link allows the user 160 to directly access the underlying data field if need be. Using the "Names to use in Report/E-mail" field, the user 160 can change the description provided by the tax program for any of the input fields tagged as "missing". Changing the name allows the user 160 to provide a more specific description to the tax payer (e.g., instead of "Home Mortgage Interest", using a description of "Interest on your BigBank Home Loan"). These descriptions can be specified at any time—including during the setup phase of the data retrieval module 120 or application 140, when the user 160 chooses to change the settings associated with the utility, or on the interface of FIG. 4. If the user 160 makes a change from one screen associated with a client, in an embodiment, the data retrieval utility 120 saves this information to be used in subsequent emails to other clients; alternatively however, the user 160 may also specify that the description only be used for the current or a subset of messages generated. If the user 160 does not choose to specify its own descriptions, this column is pre-populated with the existing data field name, otherwise it is pre-populated with shorthand or other descriptions previously provided by the user 160. The rightmost column of the table indicates whether or not an email request has been sent.

After making the appropriate selections of data items to include in the email, the user 160 can further customize the email message, by modifying the salutation, subject line, and greeting (body) text. When the user 160 is satisfied with the email, the user 160 clicks on the "Create Email" button that creates the email and provides it to an email application, for final formatting, editing, and sending. As soon as the "Create Email" option on the bottom of the interface is chosen, the data retrieval module 120 changes the status to "sent." Alternatively, the data retrieval module 120 can have a built in email interface, and directly send the email.

The data retrieval module 120 can solicit input from a client in any or a combination of different mechanisms. The email message to the client shown in FIG. 5 includes a link 70 embedded into a text description to a secure website operated by the tax preparer 160. The link 70 includes the necessary information (e.g., a client ID) to query the data repository for the relevant missing data fields for the client 110, which field information is provided to a web server. When the client 110 activates the link in the email, a browser application is invoked and contacts the web server, passing in the parameters that identify the client 110 (e.g., the client ID). The web server creates a web page including form fields for each of the missing data fields, and provides it to the browser. An exemplary web page form provided in this manner is shown in FIG. 6.

Alternatively, the data retrieval module 120 can create and send a data object to a client 110 that provides fields in which the client 110 can enter data. The object could be a HTML (or XML or other) file that can be saved once new data is entered that resembles the web page shown in FIG. 6. This way, a client 110 does not have to be connected to a network to modify and save her data. The data object can also be a simple text file, a spreadsheet, a self-extracting, self installing, executable application, or a Java applet. Other data objects, such as objects with limited input functionality like those provided by Intuit's E-Organizer application could be used or modified to provide an electronic form that the user can fill out.

In an embodiment, a form provided to the client 110, whether it be posted on a website or sent as a data object, includes data the client has already provided in a grayed out form. When the client 110 enters the missing data, in an embodiment, a utility, for instance, embedded in the form calculates a result taking into account the newly supplied data, for instance, a tax return amount. This provides an additional incentive for the client 110 to supply her missing data. In another embodiment, the missing data is associated with the source documents that have the missing data. After the data retrieval module 120 accesses the database to determine which fields are missing, it maps these to the corresponding sources, and then outputs the sources (e.g. "W-2"), rather than just the fields themselves, into a message to be provided to the client. All of these output options could be presented to the user 160 in the "Collect Missing Data Utility" interface shown in FIG. 4, in the form of a "Specify output" button shown, or through a pull-down menu, or other interface with or without user interactivity.

Receiving Requested Data

FIG. 6 shows an exemplary secure webpage generated through which a client can enter the information requested in the message shown in FIG. 5. The website contains the missing data fields and spaces to fill in the missing data. On the left hand side are provided options for communicating with the user 160, in this case, a tax preparer, including by sending him an email message or initiating a chat with the user. On the right hand side of the website there are various links to information about the requested data, and there is an option to provide a comment for any of the missing data fields. Once a client 110 has entered data, she can use the buttons on the bottom to save or send the data, or indicate that all of the requested information has been provided, by clicking on the "complete" button.

In an embodiment, a client 110 supplies the requested data using an electronic form posted to a website. The data is received by the web server, which forwards it to the data repository for storage in the client's record. In this way, the missing data is automatically added to the client's record in the database, avoiding the need for the tax preparer user to manually view and enter the data provided by the client. In an embodiment, the user can also track the client's progress, including when the website was accessed, for instance, thus helping the user to determine when a client address is no longer working. The data provided by the client 110 can be marked as "subject to confirmation" so that a user 160, when they access the client record, can review the responses received before accepting them into the client record. In another embodiment, a data object containing the data requested is returned to the user, through an email or another messaging format. In an embodiment, the object is tagged, and the data retrieval module 120 is programmed to search for it periodically on the memory of the user's computer. The data retrieval module 120 then populates the database with the data contained in the data object. Although these steps occur automatically, in an embodiment, the user 160 receives a message or indication that data has been received.

In another embodiment, the client 110 returns the information in the form of touch tone selections during a phone message that can be processed by a touch tone detection system and added to the database 130. In another embodiment, the client 110 provides the information in an email or other message, and the user 160 or other party has several options for how to enter the data. The user 160 can either enter the data by simply accessing the appropriate input field, or she can use the "missing data" utility to "Jump-to" the related fields previously marked as missing. Once data has been supplied to the field, the missing data tag is automatically removed. If no data is ever provided by the client 110 for a specific field, the user will have the ability to simply remove the missing data tag from the input field via various different means (using a function within the utility, at the input field level, or at the record level, or globally).

Status Reports

Various diagnostics and reports are available to the user 160 to view, manage, and manipulate status data at the field, record, or global level. The outputs discussed below can be generated by a report module integrated into the application 140 that queries the database 130 for the status information. FIG. 7 shows one example of a diagnostic output of all or a subset of records in the database that indicates through a checkmark in a column 80 that fields in several records have been marked as missing. The last date on which a field was tagged as missing could also be included in the interface of FIG. 7, to help a user 160 prioritize which clients 110 to pursue. An icon on the toolbar can be used to activate the data retrieval module 120 to retrieve the missing information. A user 160 can select an option to access a summary of client records that have "Missing Data." FIG. 8 shows a report that only includes records that have missing data, and provides the taxpayer's phone number with which a user 160 can call the client 110. More than one record can be manipulated, for instance, by using the global interface of FIG. 8. A user 160 could select certain records or all of the records shown, and then choose to send an email reminder to all of the clients associated with the records, for instance.

FIG. 9 shows another report that contains missing data information that can be used to automate a user's workflow. The report is generated by accessing the data records stored in the database of FIG. 1. As shown, the report lists each customer's name, and indicates which fields are still missing. The report also specifies the status of any messages sent to the client 110, and the status of the record. The utility calculates, based on the share of missing to overall fields, how complete a record is. Although FIG. 9 depicts this data in a % form, it could also be presented with various indicator icons including a red light/yellow light/green light, a horizontal status bar, or other icon. In an embodiment, a red light flashes on certain triggers, such as when a client 110 has not replied to a message sent over 30 days ago. When data has been returned to the user 160 and has been used to automatically populate the database, the fields that contain the user provided data are presented in gray, (for instance the Fields Missing associated with Customer 3 in FIG. 9) to indicate that the fields are somewhere between missing and complete.

Figures 11, 11A, 11B:
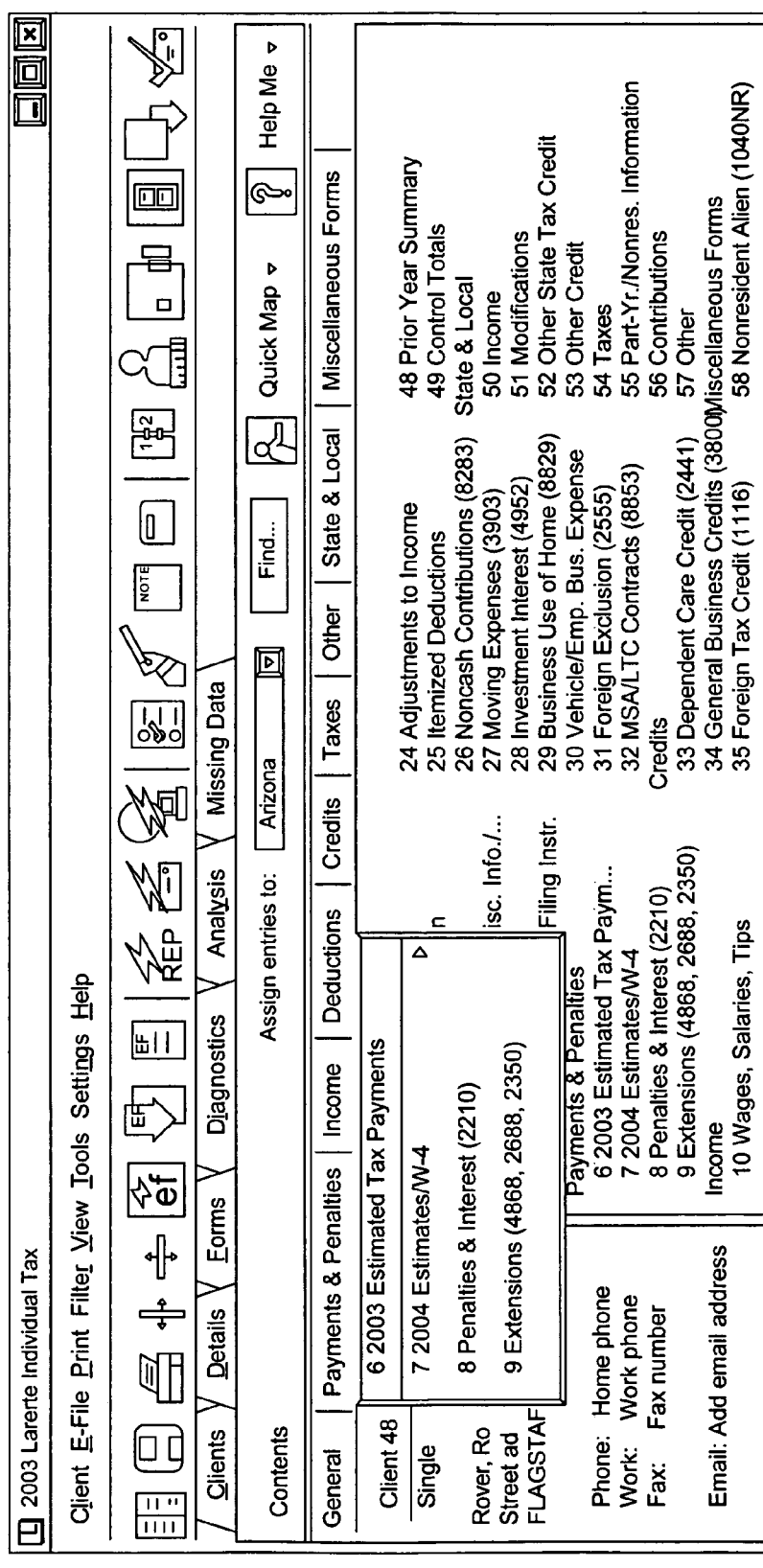
Figure 11B:
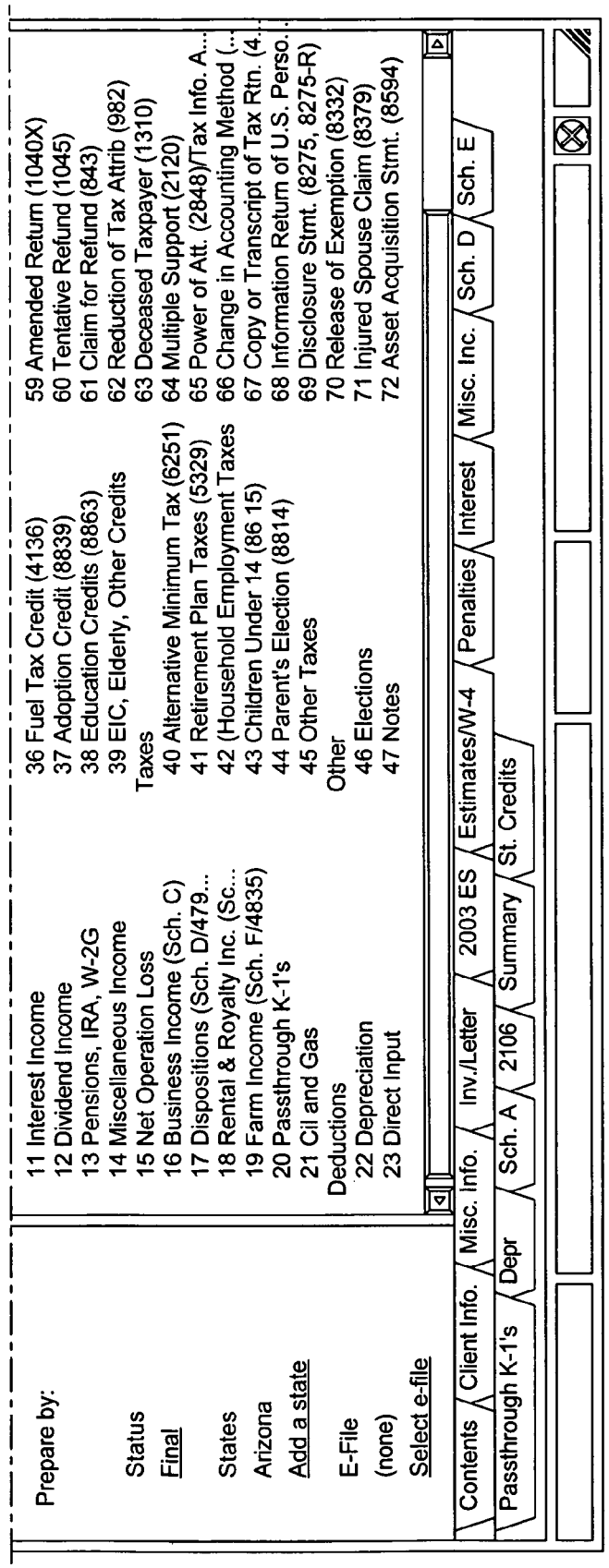

While FIGS. 7-9 depict diagnostic reports that provide a global view with which a user can manipulate several client records at the same time, FIGS. 10-12 provide additional views of client records in which missing data information contained in individual client records can be accessed or manipulated. FIG. 10 depicts a diagnostic that informs a user that missing data tags exist in the file (through the presence of the "Jump to a list link" in the Informational Diagnostics section). Clicking on the link opens the "Missing Data Utility" described above with reference to FIG. 3. As shown, fields can be designated as "critical" or "informational" and the missing data reports can reflect this distinction.

FIG. 11 shows another diagnostic report that can be adapted to contain missing data information. As shown in FIG. 11, a number of forms (e.g. 29 "Business Use of Home (8829)") and form groups (e.g. "Income" forms) are associated with an individual user. A visual indicator for missing data (for instance the appearance of a icon like a red dot or different type font) can appear at the form level, and the form group, providing the user 160 with a perspective on the missing data that is integrated into their normal workflow. A missing data tab is provided at the top of the interface that allows a user 160 to jump to a report that contains only the missing data fields. FIG. 12 shows another data report at the client level that provides the user with the status of all fields marked as missing. The status tag marked by the user 160 is provided in the "Status" section, and other notes and comments provided are also specified. The user 160 can enter in override data that will overwrite the current data, or change the status of a field, using this interface rather than having to navigate through the client record. The new information is written to the client record stored in the database/repository. This saves time if the user 160 wants to quickly manage missing data.

We claim:

1. A computer system, operated by forms preparer tasked with preparing a form for a client, comprising:

a database including a plurality of records corresponding to a plurality of clients, wherein a record comprises a plurality of fields and contact information for electronically communicating with the client associated with the record;

a status module loaded into memory, communicatively coupled to the database, and configured to;

identify a field requiring a missing data item, and assign a status to the field wherein the status assigned to the field is associated with obtaining the missing data item for the field from the client associated with the record; and a data retrieval module loaded into memory and configured to:

generate an e-mail to the client comprising a data object and a request to populate the data object with the missing data item, transmit the e-mail message to the client, receive a reply e-mail message from the client comprising the data object populated with the missing data item, and add, automatically, the missing data item from the data object in the reply e-mail to the field wherein the forms preparer and the client are separate entities, and wherein the status module is configured to assign the plurality of statuses to the plurality of fields responsive to status information provided by the user via a user interface.

2. The computer system of claim 1, wherein the data retrieval module is further configured to send an email message containing the request through a Messaging Application Programming Interface (MAPI).

3. The computer system of claim 1, wherein the data retrieval module is further configured to identify a plurality of data sources for retrieving the data, generate a plurality of requests for the plurality of data sources responsive to the plurality of statuses, and transmit the plurality of requests to the plurality of data sources.

4. The system of claim 1, wherein the status comprises one selected from the group consisting of missing, complete, and incomplete.

5. The computer system of claim 1, wherein the data retrieval module is further configured to implement an action responsive to an elapsing of a predetermined threshold of time after transmission of the request and before receipt of the response from the client.

6. The computer system of claim 5, wherein the action comprises sending one selected from the group consisting of a second request for data and a reminder of the request.

7. The computer system of claim 6, wherein the data retrieval module is further configured to track statuses of requests transmitted by the data retrieval module, and to provide the statuses of the requests to the user.

8. The computer system of claim 7, further including a report module for generating a report that includes the statuses of the requests transmitted by the data retrieval module.

9. The computer system of claim 1, wherein the data retrieval module is further configured to generate a link to a secure web server, the link including information for identifying the client with which the secure web server can create a web page for soliciting data missing from the record associated with the client, wherein the request includes the link.

10. A method of soliciting information based on a plurality of records in a database, the method comprising the steps of:

populating the plurality of records in the database, wherein each record in the plurality of records is associated with a client, includes contact information for communicating with the client, and includes a plurality of fields;

identifying a field requiring a missing data item; assigning a status to the field wherein the status assigned to the field is associated with obtaining the missing data item for the field from the client associated with the field;

generating an e-mail message to the client comprising a data object and a request to populate the data object with the missing data item;

transmitting the e-mail message to the client; receiving a reply e-mail message from the client comprising the data object automatically populated with the missing data item from the client; and updating the field using the missing data item from the data object, wherein the user is a forms preparer tasked with preparing the form for the client, wherein the forms preparer and the client are separate entities, and wherein assigning the plurality of statuses to the plurality of fields is performed responsive to status information provided by the user via a user interface.

11. The method of claim 10 wherein assigning the plurality of statuses comprises comparing data contained in the plurality of fields in the record to expected values associated with the plurality of fields.

12. The method of claim 11 wherein the expected values are determined responsive to instructions provided by the user.

13. The method of claim 10 wherein assigning, generating, and transmitting are carried out by a computer program product.

14. The method of claim 10 further comprising:

generating a plurality of information requests based on statuses of incomplete fields in the plurality of records;

transmitting the plurality of information requests to clients associated with the plurality of records, wherein the information requests indicate the incomplete fields and comprise data structures for receiving data from the clients to populate the incomplete fields;

receiving responses from the clients responsive to the request, the responses comprising the data structures; and updating incomplete fields using data from the received data structures.

15. The method of claim 10 further comprising tracking a status of the information request and providing the status of the information request to an application for monitoring retrieval of the requested information.

16. The method of claim 10 further comprising responsive to the status of a plurality of fields in a record being incomplete:

identifying a plurality of data sources for providing data associated with the plurality of fields;

generating a plurality of requests for data for the plurality of data sources; and transmitting the plurality of requests to the plurality of data sources.

17. A computer program module stored on a computer storage device, executable by a processor, the computer program module comprising logic for:

populating a plurality of records in a database, wherein each record in the plurality of records is associated with a client, includes contact information for communication with the client, and includes a plurality of fields;

identifying a field requiring a missing data item; assigning a status to the field, wherein the status assigned to the field is associated with obtaining the missing data item from a client associated with the field;

generating an e-mail to the client comprising a data object and a request to populate the data object with the missing data item;

transmitting the e-mail message to the client;

receiving a reply e-mail message from the client comprising the data object automatically populated with the missing data item; and updating the field with the missing data item from the data object, wherein the user is a forms preparer tasked with preparing the form for the client, wherein the forms preparer and the client are separate entities, and wherein assigning the plurality of statuses to the plurality of fields is performed responsive to status information provided by the user via a user interface.

18. The computer program module of claim 17, further comprising generating a link to a secure web server, the link including information for identifying the client with which the web server can create a web page for receiving requested information.

19. The computer program module of claim 17, further comprising instructions encoded thereon for transmitting the record to a receiving system.

\* \* \* \* \*